(12) United States Patent
Sen et al.

(10) Patent No.: US 8,190,571 B2
(45) Date of Patent: May 29, 2012

(54) MANAGING DATA WITH BACKUP SERVER INDEXING

(75) Inventors: Vijay Sen, Bangalore (IN); Karandeep Singh Anand, Kirkland, WA (US); Robert M. Fries, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 11/463,982

(22) Filed: Aug. 11, 2006

(65) Prior Publication Data

US 2007/0288536 A1 Dec. 13, 2007

(51) Int. Cl.
G06F 17/30 (2006.01)

(52) U.S. Cl. ........ 707/640; 707/609; 707/813; 707/821; 709/217; 709/223

(58) Field of Classification Search .......... 707/204, 707/1, 652, 609, 640, 813, 821; 382/305; 705/37; 709/201, 217, 223
See application file for complete search history.

(56) References Cited

U.S. PATENT DOCUMENTS

| | | | |
|---|---|---|---|
| 5,423,037 A | 6/1995 | Hvasshovd | |
| 5,845,295 A | 12/1998 | Houseman et al. | |
| 5,852,715 A | 12/1998 | Raz et al. | |
| 5,864,851 A | 1/1999 | Breitbart et al. | |
| 6,023,706 A * | 2/2000 | Schmuck et al. | 707/200 |
| 6,377,959 B1 | 4/2002 | Carlson | |
| 6,442,551 B1 | 8/2002 | Ofek | |
| 6,526,418 B1 * | 2/2003 | Midgley et al. | 707/640 |
| 6,571,285 B1 * | 5/2003 | Groath et al. | 709/223 |
| 6,985,901 B1 * | 1/2006 | Sachse et al. | 707/770 |
| 7,028,054 B2 | 4/2006 | Harper et al. | |
| 2004/0267751 A1 | 12/2004 | Dill et al. | |
| 2005/0114296 A1 * | 5/2005 | Farber et al. | 707/1 |
| 2005/0278458 A1 | 12/2005 | Berger et al. | |
| 2007/0100836 A1 * | 5/2007 | Eichstaedt et al. | 707/10 |
| 2007/0255662 A1 * | 11/2007 | Tumminaro | 705/79 |
| 2008/0212899 A1 * | 9/2008 | Gokturk et al. | 382/305 |

OTHER PUBLICATIONS

Merriam-webster dictionary defines "quota" as "amount".*
Merriam-Webster dictionary defines "quota" as "proportional part or share".*
Cheung, et al., "The grid protocol: a high performance scheme for maintaining replicated data", Dec. 1992, pp. 582-592, Volume: 4, Issue: 6, http://ieeexplore.ieee.org/xpl/abs_free.jsp?arNumber=180609.
Harezlak, Katarzyna, "Transaction Management on Replicated Data", http://www.edbt2000.uni-konstanz.de/phd-workshop/papers/Harezlak.pdf. Riedel, et al., "When Local Becomes Global: An Application Study of Data Consistency in a Networked World", Apr. 2001, http://www.hpl.hp.com/personal/Alistair_Veitch/papers/consistency-ipccc/ipccc.pdf.

* cited by examiner

Primary Examiner — Shahid Alam
(74) Attorney, Agent, or Firm — Workman Nydegger

(57) ABSTRACT

Indexing functionality can be shifted to one or more backup servers in a backup system. In one implementation, a backup server can receive one or more data backups from one or more production servers. The backup server can then build or create one or more indexes at the backup server, which correspond to the contents of the one or more data backups. In one implementation, one or more management agents can also identify any appropriate components that might be needed to read the backup data at the backup server pursuant to building the one or more indexes. In either case, the one or more indexes can be used for a wide range of purposes, such as to manage data usage quotas at the one or more production servers, as well as to retrieve data from the backup server based on specific file requests.

21 Claims, 4 Drawing Sheets

MANAGING DATA WITH BACKUP SERVER INDEXING

CROSS-REFERENCE TO RELATED APPLICATIONS

The present application claims the benefit of priority to Indian Patent Application Serial No. 1360/DEL/2006, filed in the Indian Patent Office on Jun. 7, 2006, and entitled "Managing Data with Backup Server Indexing," the entire contents of which are incorporated herein by reference. The aforementioned Indian Patent filing was made pursuant to USPTO Foreign Filing License No. 536,418, granted on May 23, 2006.

BACKGROUND

Background and Relevant Art

As computerized systems have increased in popularity, so have the needs to store and back up electronic files and other communications created by the users and applications associated therewith. In general, computer systems and related devices create files for a variety of reasons, such as in the general case of creating a word processing document in a work setting, as well as creating data used for more sophisticated database purposes. In addition, many of these documents can include valuable work product, or sensitive information that should be protected. One will appreciate, therefore, that there are a variety of reasons why an organization will want to backup electronic files on a regular basis, and thereby create a reliable restoration of an originally created file when needed.

Unfortunately, it is not a simple matter to just backup files, especially in larger organizations. In particular, not all files are created equally. For example, word processing and spreadsheet files tend to be relatively small, and thus require relatively little storage space. By contrast, certain types of media files, such as image files, video or music files, or the like, tend to be much larger, and accordingly tend to take up much larger storage space. In addition, some files are managed individually, while other files are managed only within the context of particular applications. For example, certain types of database data might otherwise appear as a "glob" of unintelligible information without the benefit of the database application to interpret the glob.

As a result, it is fairly common for organizations to implement policies that limit the types and amount of data that particular users can store on any given production server (e.g., mail, file, or database server, etc.) For example, the organization might allow users to store any type of word processing or spreadsheet files on a production server, but only allow the users to create and/or store work-related media files on a production server (or not at all). Along similar lines, the organization might even desire to limit users to specific quotas on certain file types.

Unfortunately, policies such as these can be fairly difficult to enforce with meaningful efficiency. For example, an administrator might desire to determine how much production server space a user is using for limited (or otherwise prohibited) types of media files. As such, the administrator might periodically search for all files with a particular media extension, such as ".au," ".mp3," ".wma," ".wmv," ".aif," ".aac," ".avi," ".divx," ".mov," ".ra," ".ram," or ".wav." The administrator might thus determine that the user is not using production server space for such files if no files with those extensions are found. The user, however, may have simply changed the file extensions on those certain media files, and thus configured them to avoid detection by the administrator's filter.

An organization might work around this sort of thing with one or more mechanisms at the production server that monitor file contents, rather than just file extensions. Furthermore, the production server might be configured with one or more mechanisms to perform real-time monitoring of specific writes and deletions made by a user. For example, the production server might identify each time a write or deletion is made on a production server volume, associate that write/deletion with a particular user, and then identify whether the write is for a particular type of limited (or otherwise prohibited) file type. The logic might then need to tally whether this particular write or deletion positions the user within or outside of a particular quota, and then make real-time adjustments to the user's privileges. One way this could be done is by indexing rich information about each file on one or more production server volumes, and then periodically scan the indexes to identify whether the user-directed file writes (or deletions) fit within a particular user quota. Ranges that appear to exceed a particular quota can then be reported to the production server administrator, who can then make corresponding adjustments to the user's privileges.

Unfortunately, one can appreciate that these types of workarounds can be computationally expensive. For example, it can be expensive to simply identify that a particular write is associated with a particular user, much less identify in real-time what that write or deletion contains. In addition, it can be computationally expensive to sum up data deletions within the context of a particular quota in real-time, and then make real-time prohibitions or allowances to a user account. Furthermore, analyzing larger file writes (e.g., certain media files) can consume more computational resources than analyzing smaller file writes. Still further, analyzing writes and deletions within a database can often require additional interfacing through the particular database application. These and other complications can be further exacerbated when trying to maintain consistency for a user's data access privileges, especially when considering multiple volumes on potentially multiple production servers in the organization.

By contrast, a backup server is generally not equipped to handle this sort of processing. For example, conventional backup servers typically operate as flat file servers, and may not, therefore, have installed the appropriate context for understanding certain types of application data, such as database application data. Rather, the backup server may simply receive backup data and return backup data corresponding to specific backup events. Such configurations can encumber the discoverability of specific data forms at a given backup server, for example, users that want to retrieve specific data backups are generally limited to requesting data saved or created within a specific period, such as files created and/or backed up "between dates x and y." Only once provided the data corresponding to the desired range are the users able to search for specific files within the recovered.

As such, there are a number of difficulties associated with data accessibility and management between production servers and backup systems that can be addressed.

BRIEF SUMMARY

Implementations of the present invention provide systems, methods, and computer program products configured to efficiently manage data usage and discoverability within an organization. In one implementation of the present invention, for example, a backup server can be provided with one or more data source components, as appropriate, to ensure proper context for reading all received data. The backup server can then index backup data it receives from one or more production servers. One or more management agents operating at any one or more of the production server or backup server can then scan the various indexes to identify, for example, which user has created which types of files. In at least one implementation, therefore, an organization can efficiently manage data quotas for users, and can easily retrieve specific data (which is now indexed) directly from a backup server while minimizing production server burdens.

For example, one implementation of a method of managing quota allocations at least in part through indexing data backups at the backup server can involve receiving data of one or more data backups from one or more production servers at a backup server. In addition, the method can involve identifying one or more data source components configured to read the received data at the backup server. The method can also involve indexing the received data at the backup server. In such a case, the one or more data properties for the received data are contained in one or more index files. Furthermore, the method can involve passing the one or more identified data properties to one or more management agents. The management agents can then compare the identified one or more data properties to the one or more data quotas.

Similarly, an alternative implementation of a method in accordance with an implementation of the present invention can involve creating one or more indexes of backup data received at a backup server from one or more production servers. In such a case, the one or more created indexes can identify one or more data properties for the received backup data. In addition, the method can involve receiving one or more requests from one or more management agents for at least a portion of the backup data received at the backup server. In general, the one or more requests can include any of the one or more data properties. The method can also involve scanning the one or more created indexes for the requested data properties. Furthermore, the method can involve sending one or more responses to the one or more management agents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to efficiently manage data usage and discoverability within an organization. In one implementation of the present invention, for example, a backup server can be provided with one or more data source components, as appropriate, to ensure proper context for reading all received data. The backup server can then index backup data it receives from one or more production servers. One or more management agents operating at any one or more of the production server or backup server can then scan the various indexes to identify, for example, which user has created which types of files. In at least one implementation, therefore, an organization can efficiently manage data quotas for users, and can easily retrieve specific data (which is now indexed) directly from a backup server while minimizing production server burdens.

To accomplish these and other features, one or more management agents are installed at a production server and/or backup server to manage backup processes and data management functions. In general, a "management agent" comprises any suitable computer-executable instructions in the form of backup agents, replica agents, quota agents, indexing services, antivirus agents, or related agents/filters. In one implementation of the present invention with respect to the MICROSOFT environment, for example, management agents 130a-b can include host (and/or guest) requesters and writers, volume filters and the like, such as may be used generally in a Volume Shadow Copy Service ("VSS").

One will appreciate, however, that such components, as well as any of these and other components that may be referenced as part of a MICROSOFT operating environment are exemplary only. In particular, one will appreciate that implementations of the present invention can be practiced in a wide range of operating environments with any number of suitable software and hardware components.

Figure 1A:
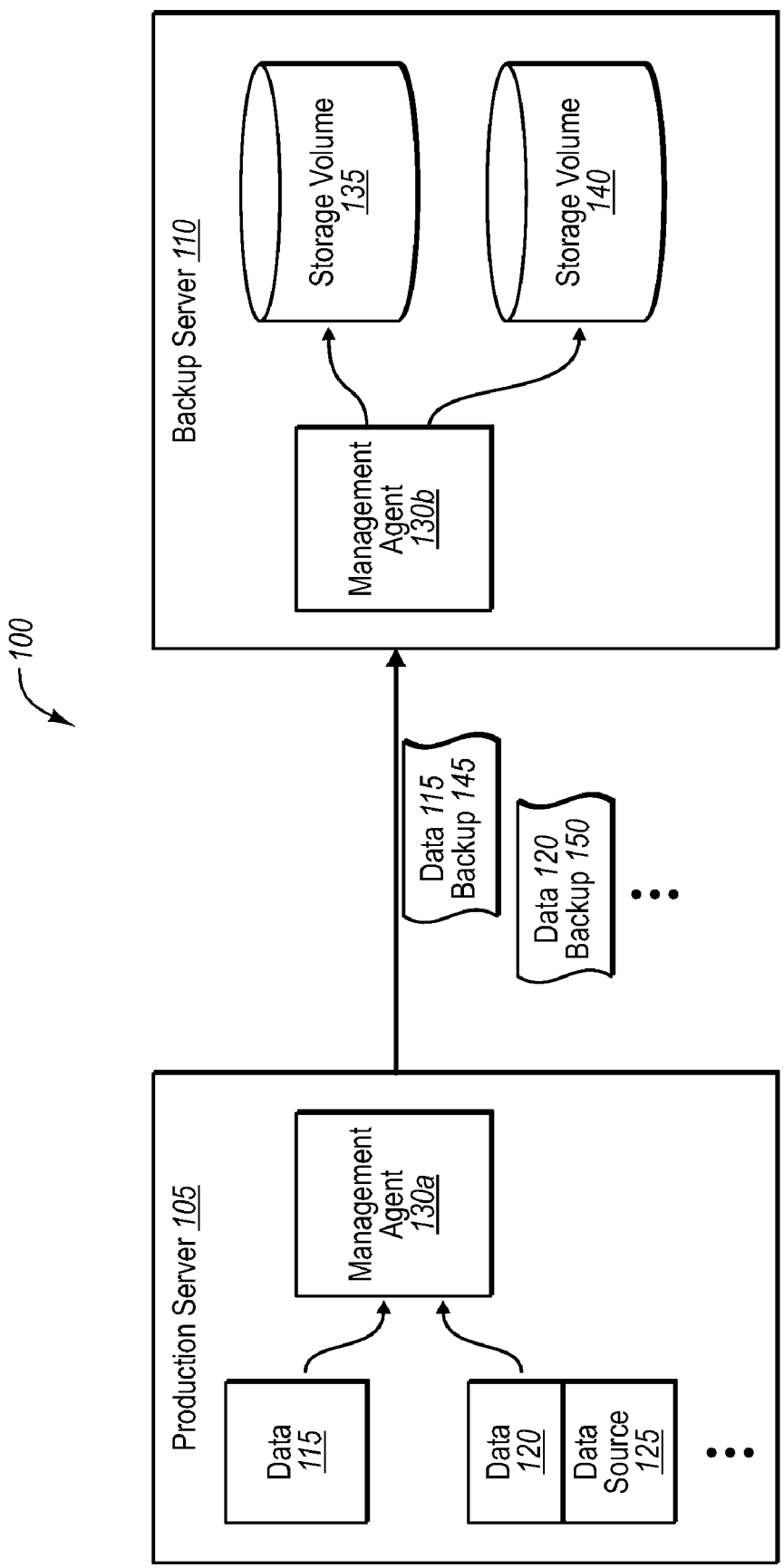
FIG. 1A illustrates an overview schematic diagram in accordance with an implementation of the present invention in which a backup server receives data backups from a production server, wherein at least some of the received data backups are associated with a particular data source.

FIG. 1A illustrates an overview schematic diagram of a computerized environment 100 (i.e., a backup system) in which a production server (e.g., a file, mail, or database server, etc.) sends data backups to a backup server. In particular, FIG. 1A shows that production server 105 includes data 115 and data 120. In general, data 115 may represent conventional file system data that may or may not need to be associated with a particular data source, such as generic text files, or the like. FIG. 1A further shows, however, that production server 105 can include data 120 that are associated with (i.e., managed and/or created by) data source 125. For example, data 120 may be any type of database, email, or other sort of application data that are managed indirectly through a particular data source (i.e., rather than direct interaction with a specific file of a file system).

FIG. 1A also shows backup server 110 comprises an association with one or more storage volumes 135, 140. In general, storage volumes 135 and 140 can be allocated on any one or more of magnetic (hard disk, tape, etc.) or optical storage media. In one implementation, storage volumes 135 and 140 can also be allocated for specific storage functions. For example, a backup administrator may have allocated storage volume 135 specifically to store only file system data and corresponding backups thereof. The administrator may alternatively have allocated storage volume 140 specifically to store data created and/or managed by one or more specific data sources (e.g., 125), such as one or more database or email applications. In addition, storage volumes 135, 140 can be allocated on different storage allocations of the same physical storage media and/or can be allocated on one or more other physical storage media connected directly or indirectly to backup server 110.

However configured, backup server 110 will receive backups (e.g., 145, 150) of data 115, 120 from production server 105, and pass those backups to its one or more storage volumes. For example, FIG. 1A shows that production server 105 prepares and sends one or more backups (i.e., 145, 150) of data 115, 120 to backup server 110 through one or more management agents (e.g., 130a-b). In particular, FIG. 1A shows that production server includes management agent 130a, which, as previously mentioned, can include any number of replica, backup, and/or shadow copy agents or related filters. Furthermore, FIG. 1A shows that management agent 130a can be configured to communicate with one or more corresponding management agents (e.g., 130b) at backup server 110. Management agent 130b at backup server 110 can also include any number of backup agents or related filters, antivirus agents or related filters, and the like. In at least one implementation of the present invention, however, management agent 130a and/or 130b further includes at least a quota agent, as discussed more fully herein.

Accordingly, FIG. 1A shows that, at some point, management agent 130a will coordinate with management 130b to initiate backup processes of the production server 105. For example, management agent 130 might be configured with one or more schedules to send backup instructions to one or more management agents 130a at production server 105. Alternatively, management agent 130a already has such a schedule stored at production server 105, and initiates backup processes on its own under the guidance of management agent 130b at backup server 110. For example, any one or more of management agents 130a-b can be configured to initiate snapshot operations of data 115, 120 at production server 125. Such snapshot operations can include preparing an initial backup of data (e.g., any of file, application, or crash-consistent snapshot) and any number of following shadow copy snapshots thereof. Upon completion of snapshot operations, management agent 130a can then send the corresponding snapshots (i.e., backups) to backup server 110 through corresponding management agent 130b.

Figure 1B:
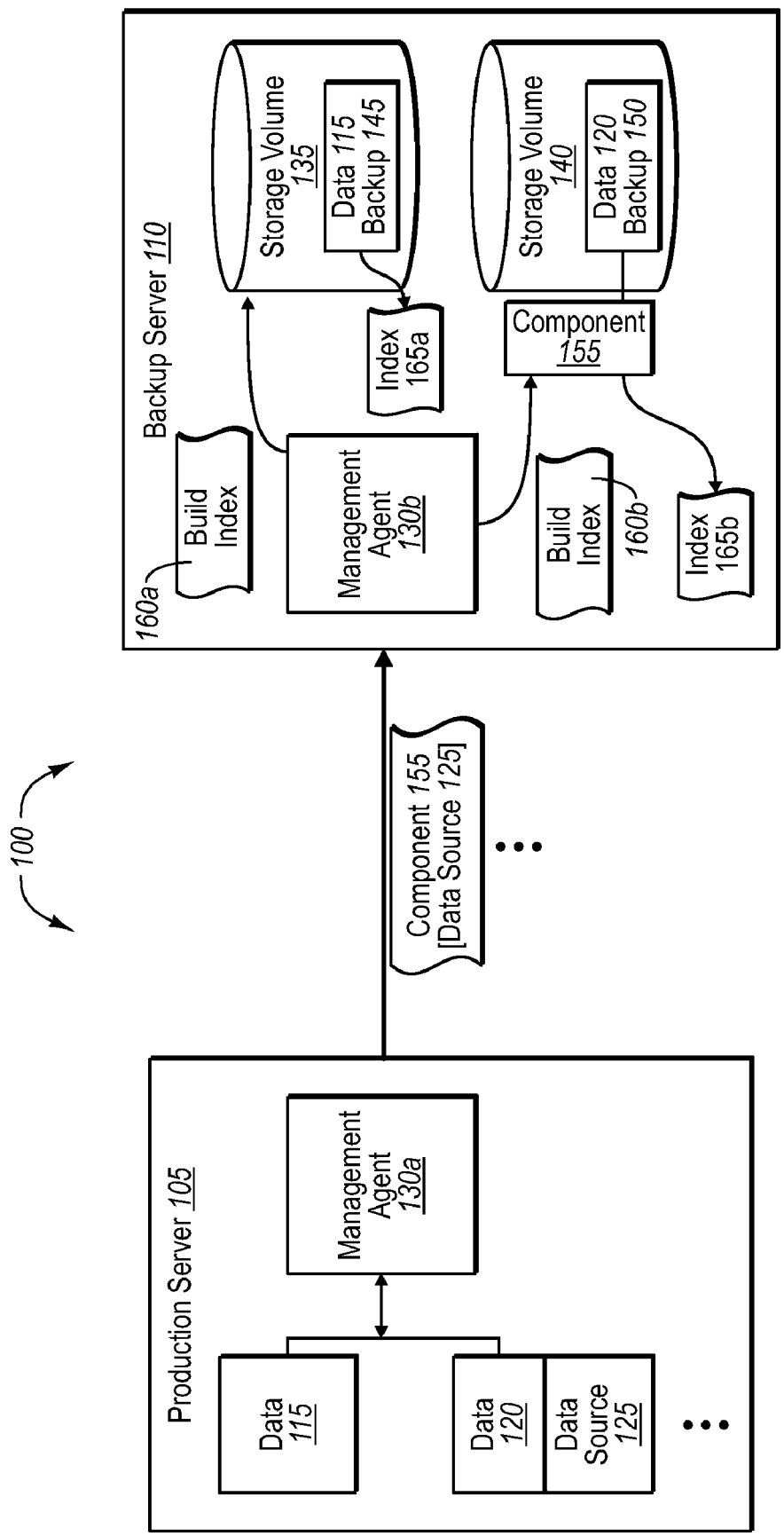
FIG. 1B illustrates the overview schematic diagram of FIG. 1A, in which the backup server receives one or more components from a production server for reading the received one or more backups pursuant to creating one or more indexes in accordance with an implementation of the present invention.

As will be appreciated more fully herein, although production server 130a can perform any number of functions on its data, production server 105 will generally not need to index its data. As illustrated in FIG. 1B, for example, such indexing services can be handled at least in part by backup server 110. To handle this indexing, however, backup server 110 will generally need to be able to read the data backups it receives. For general file system data, this may not be a complex issue since the backup server may already be configured to act primarily as a file server. Other data, however, may be configured with different formats that do not directly correlate with the data formatting at backup server 110. For example, backup server 110 may not be able to read backup 150 of data 120 without one or more appropriate data source components (e.g., application plugins, etc.)

Accordingly, FIG. 1B illustrates that when backup server 110 receives backup data (e.g., 145, 150) any one or more of management agent 130a and 130b can identify that one or more components may be needed. For example, any one or more of management agents 130a and/or 130b might determine from receiving/identifying data 120 that this data cannot be read by backup server 110 without a particular plug-in from data source 125. In one implementation, for example, management agent 130a identifies that component 155 for data source 125 is needed, and automatically forwards component 155 to management agent 130a. In another implementation, management agent 130b identifies that it cannot read the received backup data 150 without an appropriate data source component (i.e., an application plugin), and so requests this component from management agent 130a. In either case, FIG. 1B shows that management agent 130a sends component 155 which relates at least in part to data source 125.

With the appropriate software components in place, therefore, backup server 110 can then read the received data backups 145, 150 and prepare any number of corresponding data indexes. For example, FIG. 1B shows that backup server 110 initiates index build operations through management agent 130b. In particular, FIG. 1B shows that management agent 130b sends instructions 160a to build one or more indexes of the backup data in storage volume 135. In one implementation, management agent 130b comprises an indexing service component, and simply reads the backup data (e.g., 145) stored in storage volume 135 and creates a corresponding index. In another implementation, management agent 130b is configured to call one or more separate indexing components, such as a separate indexing service (not shown) installed on storage volume 135. In either case, management agent 130b directs the creation of index 165a for storage volume 135.

In addition, FIG. 1B shows that management agent 130b sends message 160b to build an index of the backup data (e.g., 150) in storage volume 140. Since the backups within storage volume 140 need to be read through one or more data source components (e.g., 155), instructions 160b can be sent via the corresponding data source components. In one implementation, for example, component 155 simply serves as a plugin that is incorporated into one or more components of management agent 130b. In other implementations, however, component 155 may be installed separately at the storage volume of interest, and thus instructions 160b to build an index are passed to the component. However configured, management agent 130b directs the creation of searchable index(es) 165b for storage volume 140. Of course, one will appreciate that it is not necessary that the instructions 160a-b to build an index of different volumes result in different indexes. In some cases, for example, the data for each index build request could be concatenated into a single index file.

In any event, indexes 165*a-b* can comprise a wide range of content with varying degrees of specificity, however configured by a particular backup administrator. For example, in addition to basic data content and location information, each index can comprise additional metadata associated with the data, such as who created the data, when the data were created, deleted, or otherwise modified. In addition, the index data can include information regarding the type of data, such as whether the data comprises basic text, or more complicated data created by a particular application.

The index data can also include whether the data comprise media files such as audio or video data, as well as the specific types of media programs used to create the file data in the first instance. Thus, one can appreciate that a backup administrator may configure some indexes to be built with greater specificity than with other indexes, depending on the type of data that are being backed up, and any needed management over the data. Furthermore, one will appreciate that a backup administrator can configure each of the created indexes so that they are cached, which can be particularly helpful for later reference where backup data is changed or subsequently moved to, for example, an archive media (e.g., tape).

Figure 1C:
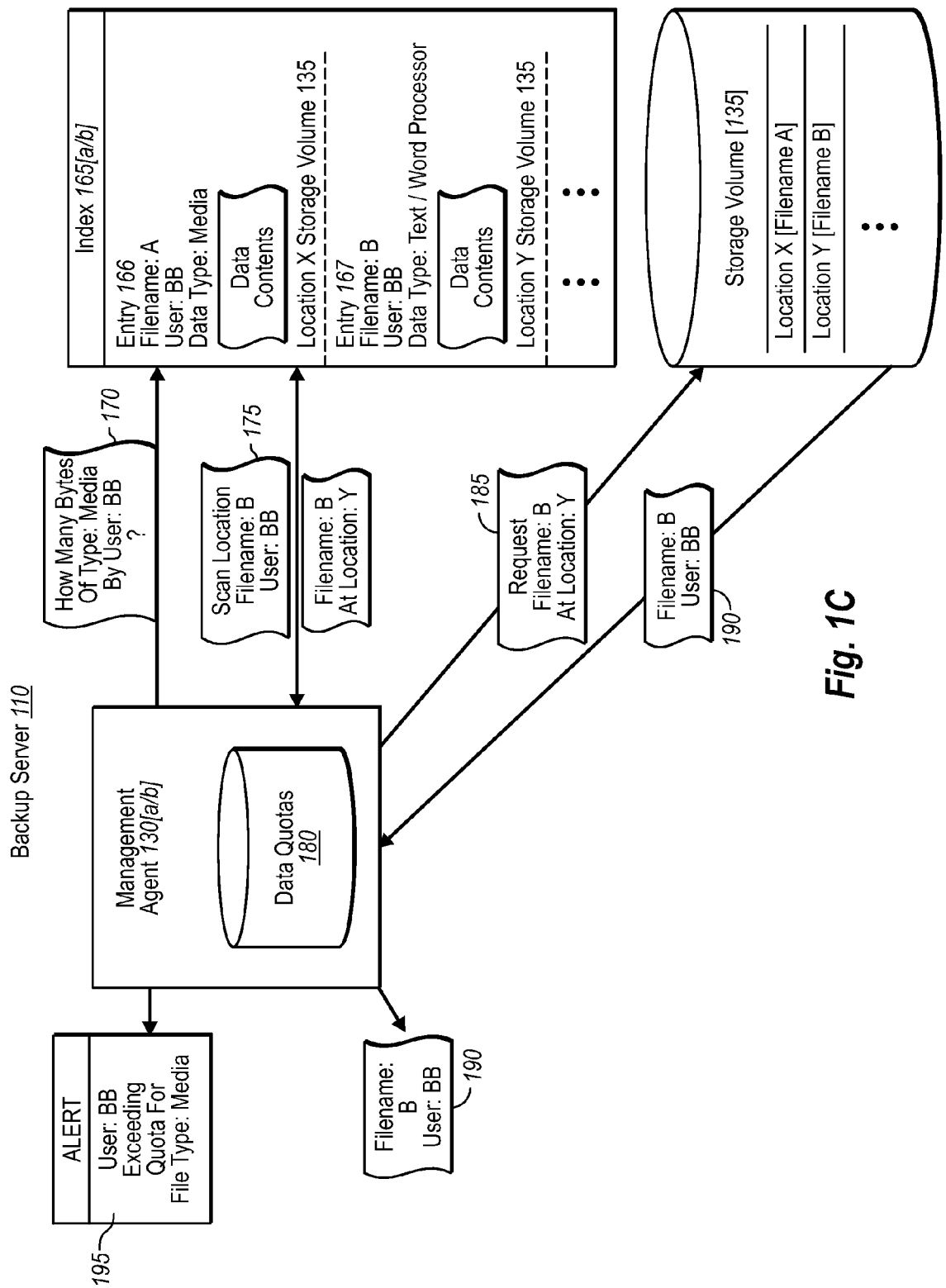
FIG. 1C illustrates a more detailed schematic diagram in accordance with an implementation of the present invention in which one or more management agents can use the indexes created by the backup server to retrieve specific data and also manage one or more data quotas.

As shown in FIG. 1C, for example, indexes 165*a* and/or 165*b* can comprise such entries as entries 166 and 167. Entries 166, in turn, include information about a specific data file, such as the file name associated with the entry, the name of the user that created the data, the general type of data for the file, and the location of the data (e.g. on a particular storage volume). FIG. 1C also shows that entries 166, 167 can include a representation of the data contents. With respect to text data, for example, this might be represented in a hash table, while with certain media content, this might be represented by certain metadata entered by the user and/or application that created the media file.

In any event, FIG. 1C shows that management agent 130*a/b* (i.e., management agent 130*a* and/or management agent 130*b*) can use the various indexes for any number of functions. As shown, for example, management agent 130*a/b* can scan index 165*a/b* (i.e., index 165*a* and/or index 165*b*) to identify whether a user has met or exceeded (i.e., violated) a particular quota. As previously mentioned, for example, an organization may set a policy that a user is only allowed 100 megabytes of media files on any particular server, or that the user has 50 megabyte of video files (more specifically) on a particular media server.

As such, management agent 130*a/b* can initiate any number of corresponding requests. In one implementation, for example, a quota agent component of management agent 130*a* at production server 105 sends instructions to management agent 130*b* at backup server 110, requesting a scan of the data properties of index(es) 165*a/b*. Alternatively, a quota agent in management agent 130*b* may be configured for periodic scanning of index(ex) 165*a/b*, and thus implement scan instructions on its own. In either case, management agent 130*b* will implement instructions to scan the various one or more indexes, and then report the results as appropriate. For example, FIG. 1C shows that management agent 130*a/b* implements scan instructions 170 of the index data to identify how many bytes of "type:media" have been created by user "BB."

Management agent 130*b* can then compare the results of that scan with a set of data quotas (e.g., 180), and thus determine whether the user is meeting, exceeding (or not) meeting these particular quotas. For example, the sum of writes and deletions read for all received backup data may result in a tally that puts user "BB" beyond a particular quota for media files. As shown in FIG. 1C, therefore, management agent 130*a/b* identifies a violation of a quota, and thus prepares and sends alert 195. For example, management agent 130*b* at backup server 110 prepares and sends alert 195 to management agent 130*a* at production server 105, or might send some other alert to a back administrator's account. As such, one will appreciate that when alert 195 can take on any number of forms, such as email, instant/text messaging, automated voice mail, or the like.

As previously mentioned, the various indexes 165*a* and 165*b* can also be used, as discussed herein, to retrieve data according to specific requests made of the backup server 110. For example, FIG. 1C shows that management agent 130*a/b* can scan index via instructions 175 for the location of "filename:B; user BB," and thus identify that "filename:B" is at location "Y" on storage volume 135. As such, FIG. 1C further shows that management agent 130*a/b* sends request 185 to the appropriate storage volume (e.g., 135, and appropriate components/interfaces). Request 185 includes as arguments "filename:B" at location "Y." Management agent 130*b* can thus retrieve this requested file via message 190, and can then forward message 190 onward to the appropriate requesting entity.

Accordingly, FIGS. 1A-1C illustrate a number of schematics and components in which at least some indexing services can be shifted from a production server to a backup server. One will appreciate that such shifting can help the production server focus on other data management and storage matters, but nevertheless still obtain the benefits of having performed indexing locally. Furthermore, a production server can also gain the benefit of being able to make specific file requests from a backup server.

Figure 3:
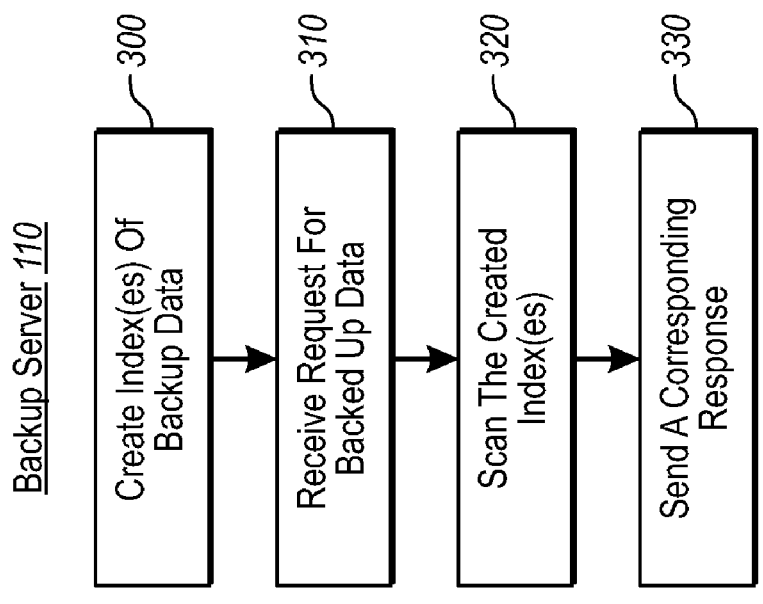
FIG. 3 illustrates a flowchart of a sequence of acts in a method in accordance with an implementation of the present invention in which a backup server manages one or more data quotas based on one or more previously created indexes of production server data backups.
Figure 2:
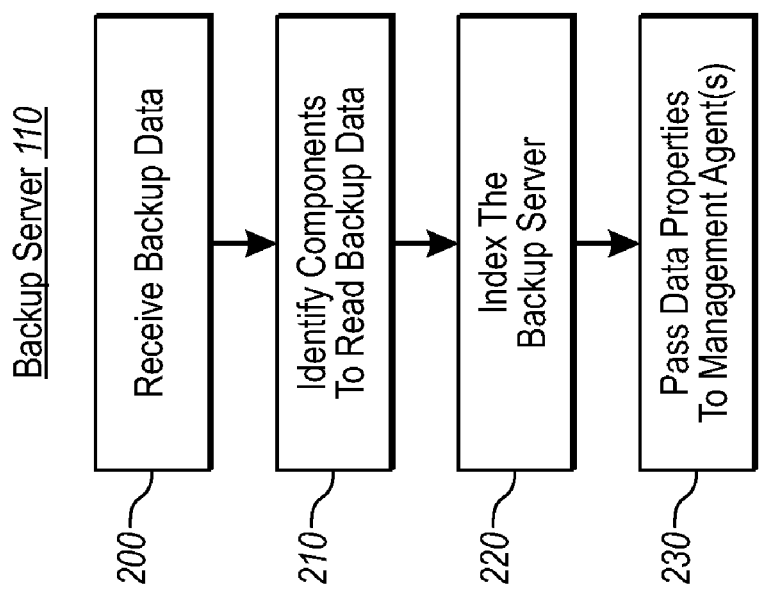
FIG. 2 illustrates a flowchart of a sequence of acts in a method in accordance with an implementation of the present invention in which a backup server manages data at least in part due to receiving one or more data source components.

In addition to the foregoing, implementations of the present invention can also be described in terms of flow charts of methods comprising sequences of acts for accomplishing a particular result. For example, FIG. 2 illustrates a flow chart from the perspective of backup server 110 for managing data (whether through quota or data retrieval functions), at least in part through indexing the data backups with the backup server. By contrast, FIG. 3 illustrates a method from the perspective of backup server 110 for providing efficient access to backup data through backup server indexes. The methods illustrated in FIGS. 2 and 3 are described below with respect to the components and diagrams and FIGS. 1A-C.

For example, FIG. 2 shows that a method from the perspective of backup server 110 can comprise an act 200 of receiving backup data. Act 200 includes receiving data of one or more data backups from one or more production servers at a backup server. For example, FIG. 1A shows that backup server 110 receives data backups 145 and 150 from production server 105. In addition, FIG. 2 shows that the method from the perspective of backup server 110 can comprise of an act 210 of identifying components to read backup data. Act 210 can include an identifying one or more data source components configured to read the received data at the backup server. For example, any one or more of management agent 130*a* or 130*b* can identify from the received data backups 145 and/or 150 that component 155 would be needed to read data 120, which is associated with data source 125.

FIG. 2 also shows that the method from the perspective of backup server 110 can comprise an act 220 of indexing the backup server. Act 220 can include indexing the received date at the backup server, such that one or more data properties for the received data are contained in one or more index files. As shown in FIG. 1B, for example, management agent 130*b* can send any one or more of messages 160a and/or 160b to build indexes of data backups 145 and 150. In at least one implementation, this can include sending the instructions (e.g., 160b) through the received data source component(s) (e.g., 155). Accordingly, FIG. 1B shows that, upon making such requests, indexes 165a and 165b are built at backup server 110.

Furthermore, FIG. 2 shows that the method from the perspective of backup server 110 can comprise an act 230 of passing data properties to management agents. Act 230 can include passing the one or more identified data properties to one or more management agents, such that the identified one or more data properties are compared to the one or more data quotas. For example, as shown in FIG. 1C, management agent 130a/b might implement scan instructions 170 with index(es) 165a and/or 165b to identify how many bytes of a particular file type (e.g., "media," or even specific media type) a specified user owns at production server 105. Management agent 130a/b can then compare the scan results to a set of data quotas 180, and determine whether to send a corresponding alert (e.g., 195).

FIG. 3 illustrates that a method from the perspective of backup server 110 of providing efficient access to backup data at least in part through indexing data backups at the backup server can comprise an act 300 of creating indexes of backup data. Act 300 includes creating one or more indexes of backup data received at a backup server from one or more productions servers, the one or more created indexes identifying one or more data properties which receive backup data. As previously described, for example, backup server 110 can receive backup 145 and 150 of data 115 and 120 respectively, which are then placed in corresponding storage volumes. Backup server 110 can then create corresponding indexes 160a and 160b, which include such data property fields (e.g., 166, 167) as file name, the user that created the data, data type, data location, and so forth.

In addition FIG. 3 shows that the method from the perspective of backup server 110 can comprise an act 310 of receiving a request for backed up data. Act 310 includes receiving one or more requests from one or more management agents for at least a portion of the backup data received at the backup server, the one or more requests including any of the one or more data properties. For example, management agent 130a and/or 130b might receive one or more requests from an entity such as a production server administrator, or from another management agent, or the like, for data to be retrieved from backup server 110. Similarly, a user at production server 105 might request a particular file created on a particular day, and send such requests to any number of management agents. The management agent(s) might, in turn, implement these one or more requests in the form of instructions 175.

FIG. 3 also shows that the method from the perspective of backup server 110 can comprise an act 320 of scanning the created indexes. Act 320 includes scanning the one or more created indexes for the requested data properties. For example, management agent 130a/b implements scan instructions 175, and determines that "filename:B" created by "user:BB" is located at location Y on storage volume 135. Accordingly, management agent 130a/b sends an appropriate request (e.g., 185) to retrieve the data as indicated in storage volume 135, and receives corresponding requested data 190. Management agent 130a/b can then pass message 190 onward to the requesting entity as appropriate. Of course, if the requested data is not found in any index, or is out of date (or missing in some other way), management agent 130a/b could also send a corresponding response to the requesting entity indicating the same.

Accordingly, FIGS. 1A-2 illustrate a number of schematics and methods that can be used to improve the efficiency of various data management functions between data servers in a backup system (e.g., 100). As discussed herein, at least one advantage of the described components and roles is that quotas and data retrieval can be efficiently managed in a backup system while avoiding significant resource expenditures at a production server. One will appreciate, however, that these are not the only functions that can be provided in accordance with these principles. In particular, a great variety of functions can be shifted to a backup server, including, for example, antivirus filtration processes. As such, the functions and components described herein are exemplary of the many different efficiencies that can be added.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a backup server in a computerized environment in which the backup server backs up data of one or more production servers, a method of managing quota allocations at least in part through indexing the data backups at the backup server, comprising the acts of:

receiving data of one or more data backups from one or more production servers at a backup server;

identifying one or more data source components configured to read the received data at the backup server;

indexing the received data at the backup server, such that one or more data properties for the received data are contained in one or more index files; and passing the one or more identified data properties to one or more management agents, such that the identified one or more data properties are compared to the one or more data quotas.

2. The method as recited in claim 1, further comprising an act of caching the one or more indexes at the backup server.

3. The method as recited in claim 1, further comprising an act of receiving one or more requests to pass the one or more identified data properties to the one or more management agents as part of a quota checking schedule.

4. The method as recited in claim 1, wherein at least one of the one or more management agents is installed on any one of the one or more production servers, such that at least a portion of the one or more identified data properties are passed to the one production server.

5. The method as recited in claim 1, wherein the one or more data source components comprise one or more application plugins.

6. The method as recited in claim 5, further comprising the acts of:

identifying that the one or more application plugins are required for creating an index of all of the received data; and requesting the one or more application plugins from the one or more production servers.

7. The method as recited in claim 6, further comprising an act of creating the one or more index files at least in part using the requested one or more application plugins.

8. The method as recited in claim 1, wherein the one or more data properties comprise a text index of data contents for the received data.

9. The method as recited in claim 1, wherein the one or more data properties comprise a file name for a file and the identity of a user that made one or more data changes.

10. The method as recited in claim 9, further comprising the acts of:

tallying each of the one or more data changes for the user; and determining at the backup server that the tally for the user is within any of the one or more data quotas.

11. The method as recited in claim 9, further comprising an act of identifying from the comparison that the one or more data changes by the user violate any of the one or more data quotas.

12. The method as recited in claim 1, further comprising an act of sending one or more alerts indicating that the any of the one or more data quotas have been violated by the user.

13. The method as recited in claim 12, further comprising an act of sending one or more instructions to delete data created by the user, such that the any of the one or more data quotas are met.

14. The method as recited in claim 1, further comprising the acts of:

receiving different data of one or more different backups from any of the one or more production servers or one or more different production servers; and indexing the received different data at the backup server, such that one or more data properties for the received different data are contained in one or more different index files.

15. The method as recited in claim 14, further comprising an act of passing the one or more data properties for the received different data to one or more different management agents.

16. At a backup server in a computerized environment in which the backup server backs up data at one or more production servers, a method of providing efficient access to backup data at least in part through indexing data the backup data at the backup server, comprising the acts of:

creating one or more indexes of backup data received at a backup server from one or more production servers, the one or more created indexes identifying one or more data properties for the received backup data;

receiving one or more requests from one or more management agents for at least a portion of the backup data received at the backup server, the one or more requests including any of the one or more data properties;

scanning the one or more created indexes for the requested data properties; and sending one or more responses to the one or more management agents.

17. The method as recited in claim 16, further comprising an act of identifying from the received backup data that one or more data source components are needed to read the received backup data at the backup server.

18. The method as recited in claim 16, wherein the identification of the one or more data source components is made by one or more management agents at the backup server upon receipt of the backup data.

19. The method as recited in claim 16, wherein the one or more responses include any of the requested portion of backup data, an indication that the requested portion of backup data does not exist, or an indication that the requested portion of backup data is not available.

20. At a backup server in a computerized environment in which the backup server backs up data of one or more production servers, a computer program product having computer-executable instructions stored thereon that, when executed, cause one or more processors at the backup server to perform a method comprising the acts of:

receiving data of one or more data backups from one or more production servers at a backup server;

identifying one or more data source components configured to read the received data at the backup server;

indexing the received data at the backup server, such that one or more data properties for the received data are contained in one or more index files;

passing the one or more identified data properties to one or more management agents;

scanning the one or more index files;

reporting the results of the scan;

comparing the results of the scan to the one or more data quotas, the results of the scan comprising information associated with the one or more identified data properties;

determining whether at least one of the one or more data quotas is one of met, not met, and exceeded.

21. A computer program product as recited in claim 20 where the computer-executable instructions, when executed, further perform:

identifying how many bytes of a plurality of file type are owned by a user at each of the one or more production servers;

summing all writes for a user, wherein each write for the user is identified from scanning the one or more index files;
summing all deletions for the user, wherein each deletion for the user is identified from scanning the one or more index files;
identifying a violation of one of the one or more data quotas, the violation comprising at least one of the sum of all writes and the sum of all deletions compared to the quota;
preparing and sending an alert for the violation of the one or more data quotas to a particular management agent at one of the one or more production servers.

* * * * *